Aug. 10, 1965 T. R. BURNIGHT 3,199,353
GRAIN TEMPERATURE SENSING DEVICE
Filed Feb. 19, 1962

INVENTOR.
THOMAS ROBERT BURNIGHT
BY
*Williamson & Palmatier*
ATTORNEYS

United States Patent Office 3,199,353
Patented Aug. 10, 1965

3,199,353
GRAIN TEMPERATURE SENSING DEVICE
Thomas Robert Burnight, Minneapolis, Minn.
(28 Hiawatha Drive, Battle Creek, Mich.)
Filed Feb. 19, 1962, Ser. No. 173,887
5 Claims. (Cl. 73—352)

This invention relates to apparatus for determining the temperature of grain stored in bins.

Grain temperature-sensing probes have been known in the past but have had distinct disadvantages, as a result of the construction of such probes they have been slow to react. Further, when it is thought that "hot spots" exist in the grain, an unnecessarily large amount of probing is necessary in order to determine whether such "hot spots" actually exist.

With these comments in mind it is to the elimination of these and other disadvantages to which my invention is directed, along with the inclusion therein of other novel and desirable features.

An object of my invention is to provide a new and improved grain temperature-sensing apparatus of simple and inexpensive construction and operation.

Another object of my invention is the provision of a novel apparatus for quickly and accurately sensing the temperature of grain stored in bins and the like.

Still another object of my invention is to provide an improved grain-temperature sensing apparatus which gives an indication of the temperature of the grain at locations remote from the apparatus.

A further object of my invention is the provision of a novel and improved grain temperature-sensing probe which will give an indication of the existence of "hot spots" in the grain at a location near the probe.

A still further object of my invention is to provide a new and novel grain-temperature-sensing apparatus which will instantly determine the temperatures of the grain at a number of locations in the bin and will indicate the approximate elevation of a "hot spot" in the vicinity of the probe.

These and other objects and advantages of my invention will more fully appear from the following description made in connection with the accompanying drawings wherein like reference characters refer to the same or similar parts throughout the several views and in which.

Figure 3:
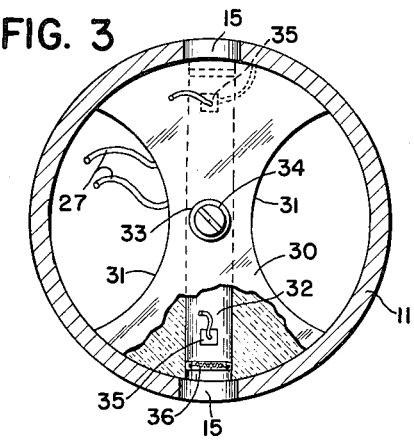
FIG. 3 is a detail, enlarged sectional view taken at 3—3 in FIG. 1.
Figure 1:
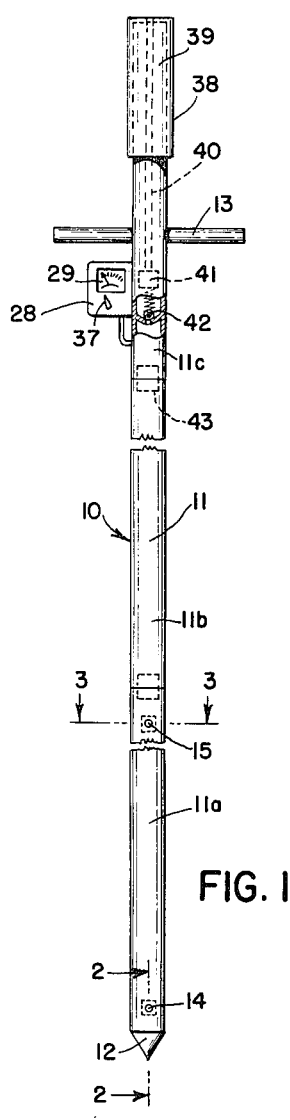
FIG. 1 is an elevation view, partly broken away and partly shown in section.
Figure 2:
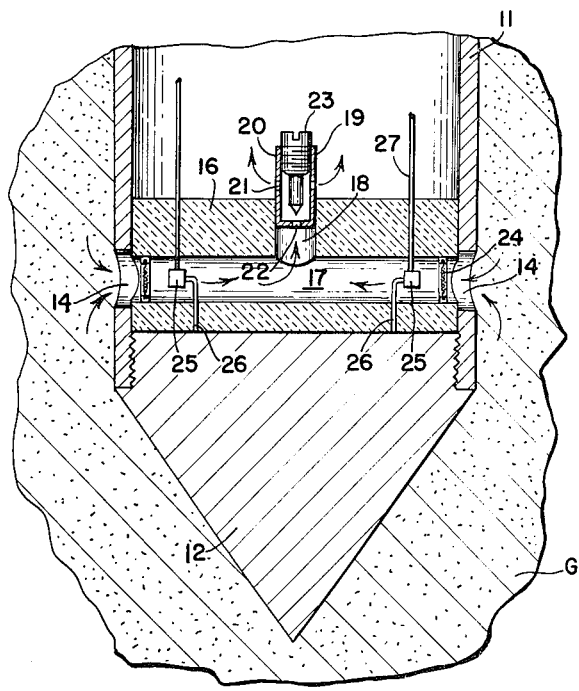
FIG. 2 is a detail and enlarged sectional view taken on a line as indicated at 2—2 in FIG. 1 and showing diagrammatically, the apparatus being inserted in a quantity of grain.

One form of the present invention is shown in the drawings and is described herein. The grain temperature-sensing apparatus is indicated in general by numeral 10 and includes an elongate hollow tubular probe 11 having a solid pointed insert 12 defining a closed lower end for the probe and the probe 11 also has a pair of handles 13 which are useful in thrusting the lower end of the probe downwardly into the grain G in the fashion shown in FIG. 2. The probe 11 has a plurality of apertures 14 and 15 in the tubular wall. The apertures 14 are disposed adjacent to lower end and in diametrically opposed relation with each other, and the apertures 15 are spaced along the probe from the apertures 14 and are also in diametrically opposed relation with respect to each other. A block 16 is constructed of heat insulating material and may be constructed of a suitable type of molded plastic. The block 16 is mounted in closely fitting relation at the interior of the tubular probe 11 adjacent the apertures 14, and the block 16 is secured in fixed relation with the probe by any suitable means such as an adhesive.

The block 16 is substantially cylindrical in shape to conform to the interior configuration of the tubular probe 11 and the block 16 is provided with an air-flow passage 17 extending across a diameter of the block and positioned so that the opposite ends of the passage 17 are in air-flow communication with the openings 14. The inner-flow passage also has a vertical portion 18 which intersects the passage portion 17, and a needle-valve apparatus 19 is fitted into the passage 18 to regulate the inward and upward flow of air. The needle-valve apparatus 19 has a cup-like fitting 20 with apertures 21 in the sides thereof and in aperture 22 in the bottom. The valve element 23 is threaded into the fitting 20 and is arranged to open and close the aperture 22.

A pair of screen-like discs 24 are respectively fitted into the open end portions of the air-flow passage 17 so as to be closely adjacent the openings 14 and to preclude entrance of grain kernels, hulls and the like into the passages. The screens 24 are held in the passage 17 in frictional relation with the block 16.

Electric circuit means are provided to sense and indicate the temperature of air flowing inwardly through the openings 14 and passage 17, and such electric circuit means includes a plurality of temperature-sensitive elements or thermistors 25 which are disposed within the air-flow passage 17 and are affixed as by adhesive to the block 16. The temperature-sensitive elements 25 are connected by means of conductors 26 to the tip 12 of the probe and are also connected by means of conductors 27 to the battery and amplifying circuitry contained in the box 28 so as to produce an indication on the meter 29 of the temperature sensed by the elements 25. The circuit contained in the box 28 is of conventional design for use in producing an indication in response to a temperature-sensitive element or thermistor and the specific nature of the electrical circuitry is not particularly critical to the present invention. It should be noted however that the temperature-sensitive elements or thermistors 25 are extremely delicate in nature and are very quickly responsive to temperature changes.

A second block 30 is provided at the openings 15 and the construction and arrangement of the block 30 is substantially identical to the arrangement of the block 16 except that the exterior figuration of the block 30 is somewhat different in view of the fact that recessed portions 31 are provided in the exterior of the block 30 so as to permit air to flow freely in an upward direction through the interior of the tubular probe 11. It will be noted that the block 30 has an air-flow passage 32 communicating with the openings 15, and also has an upright air-flow passage 33 in which the needle valve apparatus 34 is mounted for regulating the volume of air-flow; and the block 30 is also provided with temperature-sensitive elements 35 in the air-flow passage 32, and screens 36 are also provided for preventing entrance of grain. The thermistors 35 are also connected with the electrical circuitry in the box 28 for producing an indication on the meter 29 of the temperature sensed by the elements 35. The circuitry in the box 28 may be controlled by a switch knob 37 which will change, in its various positions, the connections between the meter 29 and the several temperature-sensitive elements or thermisters 25 and 35. It will be noted that the provision of dual temperature-sensitive elements in each of the air-flow passages is to provide for a possibility that one of the thermisters might become inoperative, and in that case, the other thermister in the same passage will produce an indication of the temperature of the air and the temperature of the grain in the surrounding area.

The proble 11 is also provided, at its upper end, with a pumping apparatus 38 for exhausting air in an upward direction through and from the probe 11. In the form shown, the pumping apparatus is generally similar to a hand pump used frequently in connection with bicycle tires and is provided with an upwardly and downwardly movable handle 39, stem 40 and piston 41 and a check valve 42. It should of course be understood that any other suitable means may be employed at the upper end of the probe for exhausting the air in an upward direction.

It is to be noted in the present arrangement that the probe 11 is formed in a plurality of sections 11a, 11b and 11c. These sections are releasably secured together by means of internal couplings 43 of any suitable type which will permit the upward flow of air through the probe and will permit extension of the conductors such as 27 upwardly through the probe. The couplings 43 may comprise externally threaded sleeves which are threadably secured to the internally threaded probe sections.

In operation, the probe 11 is inserted into the grain G in a bin to the desired depth, and then the pumping apparatus 38 is operated by reciprocating the handle 39 upwardly and downwardly so as to exhaust the air from the upper end of the tubular probe which causes air to flow inwardly through the openings 14 and through the passages 17 and 18. It will be recognized that the air being drawn from the grain G has the identical temperature of the grain and therefore when the temperature of the air is sensed by the thermisters 25 and is indicated by the meter 29, an indication is obtained of the grain temperature. It will be noted that there need be no substantial time delay between the emplacement of the probe in the grain and the obtaining of the temperature indication because as soon as the air is exhausted from the top of the probe, the air having the temperature of the grain is moved through the insulating block 16 and over the thermisters 25. The heat insulating nature of the block 16 eliminates the concern for any substantial transfer of heat into the thermister 25 from the probe and allows the thermister to indicate a true temperature of the air moving through the passage 17.

It will be understood that in a similar fashion, air is being drawn inwardly through the openings 15 and through the air-flow passages 32 and 33 so as to permit the thermisters 35 to sense the temperature of the air and grain at the elevated position.

The flow of air is regulated by the valve apparatus 19 to prevent excessive adiabatic cooling due to air flow over the thermisters, and to smooth out the flow of air at the thermisters so that the rate of flow of air does not vary in a pulsing manner, similar to the pulsing of of the pump. The temperature readings are therefore independant of the pumping rate.

It has been found in the use of the present invention, that when the probe is left in a certain position in the grain for a short period of time, and if the pump is continuously operated, the temperature indicated at the meter 29 may gradually rise. This indicates that air which is drawn from the grain in the immediate vicinity of the probe has one temperature, and the air which is drawn from another area of the grain in spaced relation from the probe has an increased or higher temperature. When this phenomenon is noted at the meter 29, it is recognized that one portion of the grain in spaced relation from the probe is hotter than the grain in the immediate area of the probe. The operator of the apparatus is then apprised of the fact that the grain may have a "hot spot" in the area of the probe. If a "hot spot" is detected, it will be desirable to relocate the probe in the grain so as to determine as closely as possible the exact location of the "hot spot" and also determine the size of the "hot spot." Of course if the "hot spot" is of considerable size and has a temperature considerably in excess of the surrounding grain, it may be desirable to empty the grain from the bin and move the grain into another bin.

It may also be noted that occasionally the temperature indicated will decrease as air is drawn for a period. The operator would then conclude that the probe is actually in a "hot spot."

It is also possible by use of the present invention to determine the approximate elevation of a "hot spot" in the grain G. When a gradual temperature rise is noted as a result of operation of the thermistors 25 in passageway 17, there may be no corresponding temperature rise indicated at the level of openings 15. In this case, it will be understood that the "hot spot" in the grain is fairly near the tip of the probe. However, in another instance, a gradual temperature rise may be indicated from the temperature-sensitive elements 35 at the openings 15, and if no corresponding temperature rise is indicated in the area of the tip of the probe, then it will be known that the "hot spot" is at an elevation of approximately the opening 15 or thereabouts.

If a gradual temperature rise is detected in the air flowing into the openings 14, as well as in the air flowing through the openings 15, then it will be known that the position of the "hot spot" is at an elevation between the positions of openings 14 and 15, or it may indicate that a "hot spot" of very considerable size is present in the grain G. Although in the instant disclosure, only a pair of openings 14 and 15 are shown in the probe, it should be particularly noted that substantially more than two sets of openings in the probe and two blocks of the type disclosed may be used in either the bottom section of the probe or in intermediate sections, so that all elevations of the grain in the bins may be checked.

It will, of course, be understood that various changes may be made in the form, detail, arrangement and proportions of the parts without departing from the scope of my invention which consists in the matter described herein and set forth in the appended claims.

What I claim is:

1. Apparatus for sensing the temperature of grain and the like stored in bins, comprising a rigid tubular probe having a lower end to be moved into the grain and having an upper end, the lower end having an upright peripheral wall with an opening therein to permit inflow of air, a heat-insulating block in the tubular probe and having an air flow passage therein and communicating with the opening in said probe, a pointed tip affixed on the lower end of the tubular probe below said opening and below said block, said tip closing the lower end of the tubular probe, a temperature-sensing element mounted in the block in the passage thereof, a screen preventing grain from traveling through the passage in the block toward the temperature-sensing element, electric circuit means connected with said temperature-sensing element and including means of producing an indication in response to a sensed temperature by said element, and means connected with the upper end of the tubular probe for moving air upwardly out of the probe and to thereby draw air from the grain over said temperature-sensing element.

2. The invention set forth in claim 1 and including air flow regulating apparatus in the passage of said block whereby the flow of air may be carefully regulated to maintain a constant flow of air over the temperature-sensing element.

3. Apparatus for sensing the temperature of grain and the like stored in bins, comprising a tubular probe having a closed lower end to be moved downwardly into the grain and also having an upper end, said probe having a plurality of openings spaced from each other along the length of the probe, an electric circuit means including a pair of temperature-sensitive elements, said circuit means also including indicating means responsive to the respective temperature sensed by said elements, each of said temperature-sensitive elements being disposed adjacent a respective opening in the probe and in temperature sensing relation with the inwardly flowing air through the corresponding opening, and means connected with the upper end of the tubular probe for moving air upwardly out of the probe and to thereby draw air from the grain over said temperature-sensing elements.

4. Apparatus for sensing the temperature of grain and the like stored in bins, comprising a tubular probe having a closed lower end to be moved downwardly into the grain and also having an upper end, said probe having a plurality of openings in the wall thereof communicating with the hollow interior and spaced from each other along the length of the probe, electric circuit means including a plurality of temperature-sensitive elements for sensing air temperatures, said circuit means also including indicating means responsive to the temperatures sensed by said individual elements, a pair of conduit means each defining an air-flow passage within the probe and communicating with a respective opening in the probe wall, each of said temperature-sensitive elements being disposed within a respective air-flow passage and adjacent a corresponding opening for sensing the temperature of air flowing inwardly from the grain into the opening and into the interior of the probe, and means connected with the upper end of the tubular probe for moving air upwardly out of the probe.

5. Apparatus for sensing the temperature of grain and the like stored in bins, comprising a tubular probe having a closed pointed lower end to be moved downwardly into the grain and also having an upper end, a heat-insulating block in the probe adjacent the lower end thereof, the probe having an opening in the side wall thereof which will permit inflow of air from the grain, the block having an air-flow passage communicating at one end with the opening in the probe wall and said passage opening in an upward direction through the exterior of the block to permit air flow through the passage in an upward direction into the interior of the probe, electric circuit means including a temperature-sensitive element mounted on the block in the air-flow passage in temperature sensing relation with the air moving through said passage, and said electric circuit means also including indicating means responsive to the temperature sensed by said sensing element, a needle valve apparatus in said air-flow passage of the block for regulating flow of air thereto, and a pump on the upper end of the probe for moving air upwardly through the probe from said opening and said block and for exhausting the air at the upper end of the probe, whereby to draw the air from the grain over the temperature-sensitive element for obtaining a substantially instantaneous indication of grain temperature.

References Cited by the Examiner
UNITED STATES PATENTS

| | | |
|---|---|---|
| 1,971,271 | 8/34 | Mennesson. |
| 2,904,443 | 9/59 | Manns. |
| 2,947,166 | 8/60 | Palmer _____ 73—40.7 |

LOUIS R. PRINCE, *Primary Examiner.*

ISAAC LISANN, *Examiner.*